United States Patent
Yao et al.

(10) Patent No.: US 8,446,693 B2
(45) Date of Patent: *May 21, 2013

(54) SYSTEM AND METHOD FOR A SUBAMBIENT PRESSURE AIR BEARING SLIDER UTILIZING NEGATIVE PRESSURE GROOVES

(75) Inventors: Ming Gao Yao, Dongguan (CN); Masashi Shiraishi, Kowloon (HK); Yi Ru Xie, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 1321 days.

This patent is subject to a terminal disclaimer.

(21) Appl. No.: 11/866,334

(22) Filed: Oct. 2, 2007

(65) Prior Publication Data

US 2008/0030901 A1 Feb. 7, 2008

Related U.S. Application Data (63) Continuation of application No. 10/793,553, filed on Mar. 4, 2004, now Pat. No. 7,339,766.

(30) Foreign Application Priority Data

May 20, 2003 (WO) ............... PCT/CN03/00368

(51) Int. Cl.
*G11B 5/60* (2006.01)
(52) U.S. Cl.
USPC ............ 360/235.6; 360/235.7; 360/236.4; 360/236.5

(58) Field of Classification Search
USPC ............... 360/235.4, 235.8, 236.6, 237
See application file for complete search history.

(56) References Cited

U.S. PATENT DOCUMENTS

| | | | | |
|---|---|---|---|---|
| 5,218,495 A * | 6/1993 | Chapin et al. | ............. | 360/236.1 |
| 5,274,518 A * | 12/1993 | Chapin et al. | ............. | 360/236.1 |
| 5,982,582 A * | 11/1999 | Ye et al. | ............. | 360/236.4 |
| 6,023,393 A * | 2/2000 | White | ............. | 360/234.2 |
| 6,188,547 B1 | 2/2001 | Gui et al. | | |
| 6,356,412 B1 | 3/2002 | Levi et al. | | |
| 6,424,494 B1 * | 7/2002 | Koishi | ............. | 360/235.6 |
| 6,466,410 B2 | 10/2002 | Polycarpou et al. | | |
| 6,477,012 B1 | 11/2002 | Park et al. | | |
| 6,611,400 B1 * | 8/2003 | Polycarpou et al. | ....... | 360/236.6 |
| 6,865,059 B2 * | 3/2005 | Sasaki et al. | ............. | 360/246.2 |
| 7,262,937 B2 * | 8/2007 | Pendray et al. | ............. | 360/235.1 |
| 2002/0041467 A1 * | 4/2002 | Boutaghou et al. | ........ | 360/236.1 |
| 2002/0060881 A1 * | 5/2002 | Chapin et al. | ............. | 360/235.8 |
| 2002/0191341 A1 | 12/2002 | Kohira et al. | | |
| 2003/0002218 A1 | 1/2003 | Koishi | | |
| 2004/0095680 A1 * | 5/2004 | Takahashi | ............. | 360/236.3 |
| 2005/0185342 A1 * | 8/2005 | Tani | ............. | 360/235.6 |
| 2007/0086112 A1 * | 4/2007 | Shimizu et al. | ............. | 360/234.3 |

FOREIGN PATENT DOCUMENTS

| | | |
|---|---|---|
| JP | 10283745 A | 10/1998 |
| JP | 11120727 A | 4/1999 |
| JP | 2000353370 A | 12/2000 |

* cited by examiner

*Primary Examiner* — Jefferson Evans
(74) *Attorney, Agent, or Firm* — Nixon & Vanderhye PC (57) ABSTRACT

A system and method are disclosed for a subambient pressure air bearing slider utilizing negative pressure grooves. In one embodiment, a groove extends from a slider's leading edge, splits, and terminates in two locations at the slider's trailing edge. In one embodiment, a groove is provided in a slider's compression pad near the trailing edge of the slider.

19 Claims, 7 Drawing Sheets

SYSTEM AND METHOD FOR A SUBAMBIENT PRESSURE AIR BEARING SLIDER UTILIZING NEGATIVE PRESSURE GROOVES

Related Applications

This application is a Continuation of U.S. patent application Ser. No. 10/793,553 filed on Mar. 4, 2004, which claims the benefit of priority to PCT/CN03/00368, filed on 20 MAY 2003. A Divisional application with U.S. patent application Ser. No. 11/527,997, was filed on Sep. 27, 2006.

BACKGROUND INFORMATION

The present invention is directed to air bearing slider designs in hard disk drives. More specifically, the present invention pertains to a configuration for a subambient pressure air bearing slider utilizing negative pressure grooves.

Figure 1:
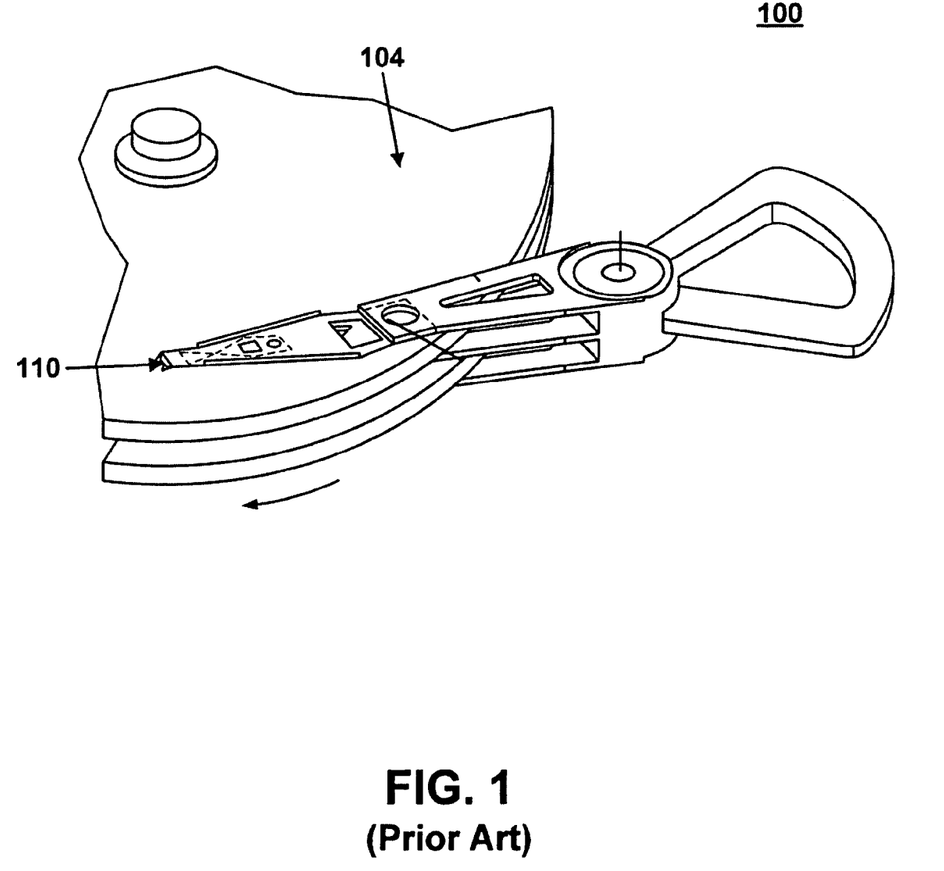
FIG. 1 illustrates a hard disk drive design typical in the art.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The air flow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104 (see below), and greatly influences its ability to fly over the disk under various conditions.

Figures 2A, 2B:
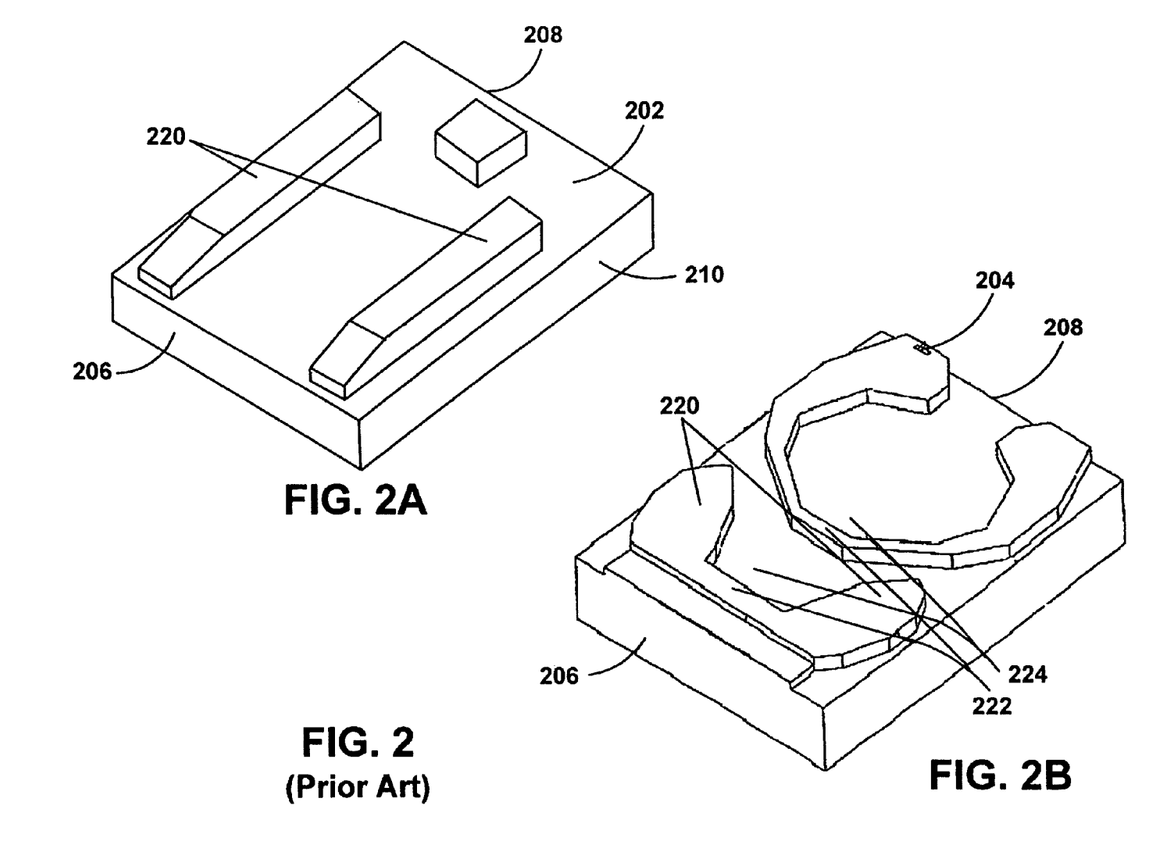
FIGS. 2a-b illustrate a typical design for an air bearing surface (ABS) on a slider.

FIG. 2 illustrates a typical design for an air bearing surface (ABS) on a slider. Some of the major objectives in ABS 202 designs are to fly the slider 210 and its accompanying transducer 204 as close as possible to the surface of the rotating disk (not shown), and to uniformly maintain that constant close distance regardless of variable flying conditions. The height or separation gap between the transducer 204 of the air bearing slider 210 and the spinning magnetic disk is commonly defined as the flying height. In general, the mounted transducer or read/write element 204 flies only approximately a few micro-inches above the surface of the rotating disk. The flying height of the slider 210 is viewed as one of the most critical parameters affecting the magnetic disk reading and recording capabilities of a mounted read/write element 204. For example, there are many advantages for reducing or having a relatively small flying height. A relatively small flying height allows the transducer 204 to achieve greater resolution between different data bit locations and magnetic fields emanating from closely defined regions on the disk surface. Also, a low flying slider 210 is known to provide improved high density recording or storage capacity of magnetic disks which is usually limited by the distance between the transducer and the magnetic media. Narrow separation gaps permit shorter wavelength signals to be recorded or read as a result. At the same time, with the increasing popularity of lightweight and compact notebook type computers that utilize relatively small yet powerful disk drives, the need for a progressively smaller slider body 210 with a lower flying height has continually grown.

It has also been observed that a constant flying height provides desirable benefits which may be more readily achieved through particular ABS 202 designs. Fluctuations in flying height are known to adversely affect the resolution and the data transfer capabilities of the accompanying transducer or read/write element 204. The amplitude of the signal being recorded or read does not vary as much when the flying height is relatively constant. Additionally, changes in flying height may result in unintended contact between the slider assembly and the magnetic rotating disk. Sliders 210 are generally considered to be either direct contacting, pseudo-contacting or flying sliders which is descriptive of their intended contact with a rotating disk. Regardless of the type of slider, it is often desirable to avoid unnecessary contact with the surface of the spinning magnetic disk so as to reduce the wear on both the slider body and the disk. The deterioration or wear of the recording media may lead to the loss of recorded data, while slider 210 wear may also result in the ultimate failure of the transducer or magnetic element 204.

What often causes changes to the flying height is the continual high-speed movement of the slider 210 across the rotating disk while performing read or write operations. For example, depending on the radial position of the slider 210, the respective linear velocity of the disk varies. Higher velocities are observed at the outer edge of the rotating disk, while lower velocities are found at the inner edge. As a result, the air bearing slider 210 flies at different relative speeds at different radial positions relative to the disk. Because sliders typically fly higher at higher velocities, there is a tendency for flying heights to increase when positioned above the outer regions of the disk. At the same time, lower velocities at the inner regions of the disk cause the slider 210 to fly lower. Accordingly, slider 210 designs must account for the noticeable effect that variations in radial position, and relative velocity, have on the flying height.

The flying height of a slider 210 is also adversely affected by changes in skew. The skew angle is defined and measured as the angle formed between the longitudinal axis of the slider 210 body and the direction of the air flow tangential to the disk rotation. When the mounted slider 210 is positioned near the inner or outer edges of the spinning disk, its longitudinal axis is often skewed in relation to the direction of the air flow. The longitudinal axis of the slider 210 may be defined as a center line of reference running along the length of the slider body. These angular orientations or skew angles typically vary as a rotary actuator arm and gimbal suspension assembly turns about its pivot point thereby moving the slider in an arcuate path across the rotating disk. In view of the growing demand for compact disk drives having relatively smaller actuator arms, larger skew angles are ever more present because of the shortened arm length. It has often been observed that at skew values above zero, sliders are pressurized at reduced values which cause an undesirable decrease in flying height. Even a relatively moderate skew angle range adversely affects the flying capabilities of a slider 210. As a result, ABS designs continually attempt to minimize slider sensitivity to changes in skew.

Another fluctuation in flying height may be identified as slider roll. The roll angle is measured and defined by the difference in flying height between the longitudinal sides of the slider. Whenever a slider flies at skew with respect to the direction of the air flow, an unequal pressure distribution tends to occur between the ABS and the disk. This imbalance causes slider roll where one side of the slider body is closer to the disk surface than the other side. A slider, however, is preferably positioned at a constant slider roll regardless of any changes in the flying conditions including differences in tangential velocity between the inner and outer tracks of the rotating disk, and continuous lateral movement above the surface of the disk or varying skew angles.

Various designs exist for the ABS 202 of sliders 210. For example, as shown in FIG. 2a, in a common catamaran slider, a pair of parallel rails 220 are formed on the slider body 210 that extend along the outer edges of the slider surface facing the disk. Other ABS configurations with various surface areas and geometries have also been developed, such as the design illustrated in FIG. 2b. Rails 220 and other formations typically run along at least a portion of the slider body length from the leading edge 206 to the trailing edge 208. The leading edge 206 is defined as the edge of the slider 210 that the rotating disk passes before running the length of the slider 210 towards a trailing edge 208. The leading edge 206 may be tapered despite the large undesirable tolerance typically associated with this machining process. The transducer or magnetic element 204 is typically mounted at some location along the trailing edge 208 of the slider 210. The rails 220 form an air bearing surface on which the slider flies, and provide the necessary lift upon contact with the air flow created by the spinning disk. As the disk rotates, the generated wind or air flow runs along underneath, and in between, the catamaran slider rails 220. As the air flow passes beneath the rails 220, the air pressure between the rails 220 and the disk increases thereby providing positive pressurization and lift. Catamaran sliders generally create a sufficient amount of lift, or positive load force, to cause the slider to fly at appropriate heights above the rotating disk. In the absence of the rails 220, the large surface area of the slider body would produce an excessively large air bearing surface area. In general, as the air bearing surface area increases, the amount of lift created is also increased. Without rails 220, the slider would therefore fly too far from the rotating disk thereby foregoing all of the described benefits of having a low flying height. A flexible gimbal often provides the slider 210 with multiple degrees of freedom such as vertical spacing, or pitch angle and roll angle which describe the flying height of the slider.

Although simple catamaran sliders are initially effective in providing an adequate flying height, they are especially sensitive to varying skew angle ranges and other adverse flying conditions. When the skew angle is increased, such as when the flying slider moves across the rotating disk, the air pressure distribution beneath the rails 220 may become distorted. By accessing both inner and outer portions of a disk at relatively high speed, air is introduced in an uneven amount under each rail 220 which typically causes slider roll. As a result, the slider 210 experiences an uneven distribution of pressure which may cause the slider to roll in one direction such that the flying height is not uniform between the ABS rails 210. The mounted transducer 204 may therefore be unable to operate effectively or accurately perform its data transfer operations. Regardless of the sensitivity of the ABS rails 220 to various skew ranges and other adverse flying conditions, this rail design is widely acknowledged as a general configuration that provides effective pressurization or lift to enable a slider to fly.

In order to counteract the positive pressurization of the flying slider body to provide a low and constant flying height, it is known to form an ABS that also provides negative or subambient pressurization to pull or draw the slider body towards the disk. For example, negative pressure air bearing (NPAB) or self loading sliders have been known to provide a counteracting negative pressure load. In this dual pressurization scheme, the ABS may be generally formed with a leading edge 206, a trailing edge 208, side rails 220, and one or more cross-rails 222 that extend between the side rails 220. The cross-rail(s) 222, which are often positioned closer to the leading edge 206 than the trailing edge of the slider, creates a subambient pressure region 224 trailing each cross-rail 222 and in between the side-rails 220. The subambient pressure region 224 creates a negative pressure or load that counteracts the positive pressure generated along the side rail portion of the ABS. This counteraction of negative and positive forces has been known to increase the stability and air bearing stiffness of the slider 210, provide rapid slider take-off, and reduce its sensitivity to variations in conditions such as changing disk velocity and radial movement which cause fluctuations in flying height. The compensating changes in positive and negative pressure, in accordance with the varying velocity between the inner and outer tracks of the disk, contributes to the overall objective of maintaining a substantially constant and steady flying height. However, the offsetting forces created in a subambient pressurization scheme may often present undesirable effects that actually cause variations in flying height. A NPAB slider often exhibits noticeable roll as well, and a reduction in flying height at skewed conditions because of unequal pressurization or distribution of air beneath the rails.

All of the aforementioned ABS configurations and modifications for air bearing sliders attempt to achieve a low and constant flying height. Different degrees of effectiveness are provided by these ABS designs which overall do not control flying height, or pitch and roll angles very well. For example, many existing ABS designs have been observed to exhibit an extremely increased slider roll angle over outer tracks regions of a disk. These configurations also typically fail to control the increase in slider pitch angle when moving from inner track to the outer track regions. Thus, there exists a need for an ABS configuration for an air bearing slider that effectively maintains constant flying height and controls roll angle to achieve a greater "stiffness" to the air bearing regardless of constantly changing flying conditions such as the difference in relative velocity at the outer and inner regions of a disk, the relative positioning of a slider over a rotating disk, and varying skew angles ranges.

DETAILED DESCRIPTION

Figures 3A, 3B, 3C:
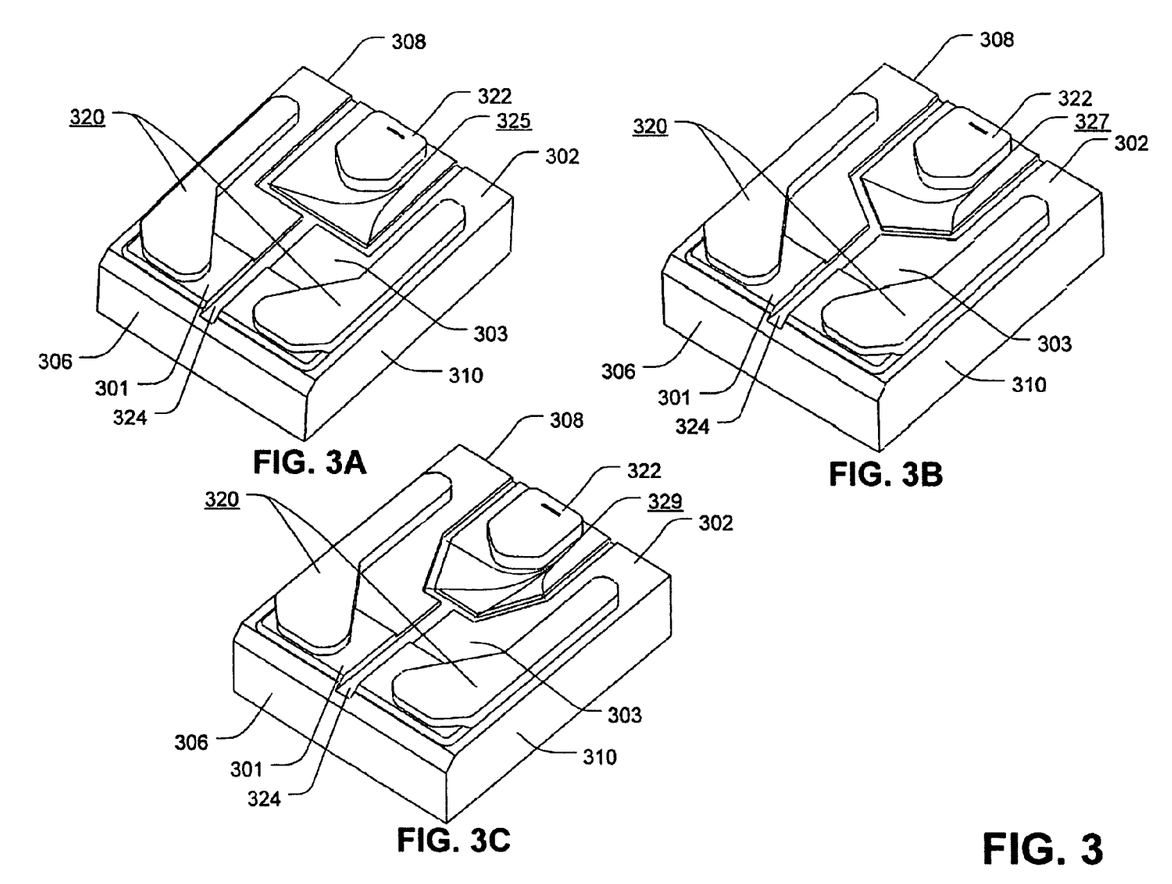
FIGS. 3a-c illustrate three sliders with ABS designs according to embodiments of the present invention.

FIG. 3 illustrates three sliders with air bearing surface (ABS) designs according to embodiments of the present invention. As illustrated in FIG. 3a, in one embodiment, a slider 310 has an ABS 302 with two longitudinally oriented rails 320. In one embodiment, a base level (first structure) 303 is at a depth (first depth) from the rails 320. In this embodiment, a cross rail (second structure) 301 is provided between the rails 320 and near the leading edge 306. The cross rail 301 is at a depth (second depth) less than the depth of the base level 303. Further, in this embodiment, a compression pad (third structure) 322 is provided in the middle near the trailing edge 308 of the slider 310.

In this embodiment, a groove (e.g., first, second, and third groove segments) 324 exists between the rails 320 that runs from the leading edge 306 to a location near the center of the ABS 302, where the groove 324 splits, extending to the trailing edge 308 of the slider 310 on both sides of the compression pad 322. As shown in FIG. 3a, in one embodiment, the groove 324 splits and extends around both sides of the compression pad 322 by right-angled bends 325 in the groove 324. As shown in FIG. 3b, in one embodiment, the groove 324 splits and extends around both sides of the compression pad 322 by a bend 327 on each side angled less than 90°. As shown in FIG. 3c, in one embodiment, the groove 324 splits and extends around the compression pad 322 by two bends 329 on each side of the pad 322 with angles totaling 90° (each side). In one embodiment, this groove 324 provides the slider 310 with additional negative pressure regions as airflow crosses the groove 324, increasing downforce and, thus, improving slider stability (stiffness).

Figure 4A:
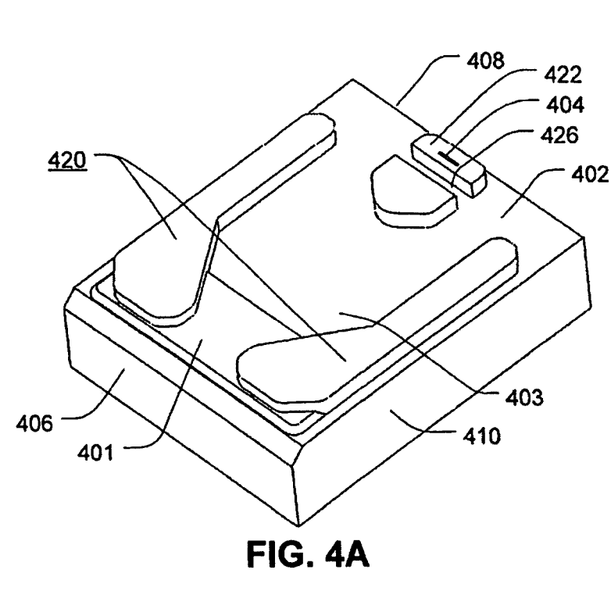
FIGS. 4a-b illustrate two sliders with ABS designs according to embodiments of the present invention.
Figure 4B:
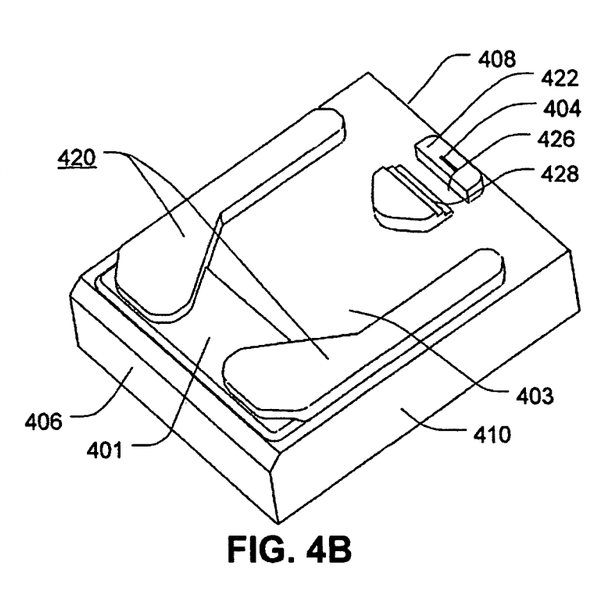
Figure 5A:
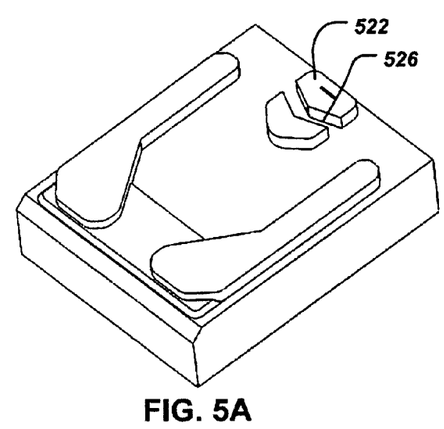
FIGS. 5a-d illustrate four sliders with ABS designs according to embodiments of the present invention.
Figure 5B:
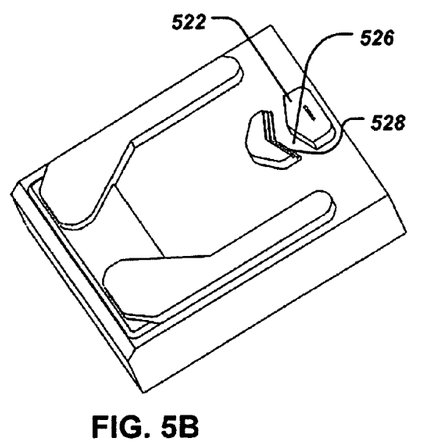
Figure 5C:
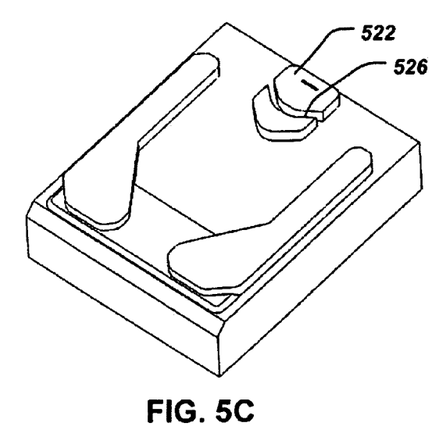
Figure 5D:
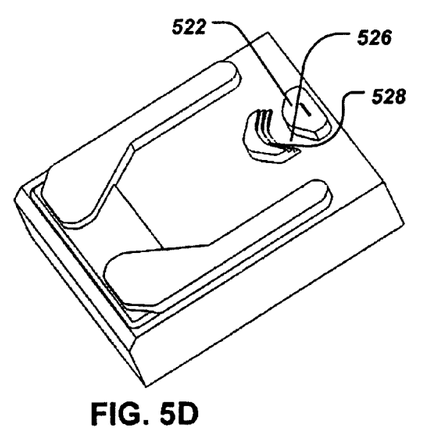

FIG. 4 illustrates two sliders with air bearing surface (ABS) designs according to embodiments of the present invention. As shown in FIG. 4a, in one embodiment, the ABS 302 has two rails 320 and a cross rail 301, similar to above. However, in this embodiment, a groove 426 is provided in the compression pad 422. In this embodiment, the groove 426 is to the depth of the base level 403 and is in a direction generally perpendicular to the direction of the rails 420. As shown in FIG. 4b, in one embodiment, the groove 426 has a wall that is stair-stepped 428. These configurations with a compression pad groove provide additional downforce (and, thus, stability) for the trailing edge 408 of the slider 410. Further, the groove 426, which is located directly in front (leading) of the head transducer 404 causes a pressure drop which helps to divert dust and other contaminants away from the head 404.

FIG. 5 illustrates four sliders with ABS designs according to embodiments of the present invention. As shown in FIG. 5a, in one embodiment, an angled groove 526 is provided in the compression pad 522. As shown in FIG. 5b, in one embodiment, the angled groove 526 has a stair-stepped wall 528. As shown in FIG. 5c, in one embodiment, a curved groove 526 is provided in the compression pad 522. And, as shown in FIG. 5d, in one embodiment the curved groove 526 has a stair-stepped wall 528.

Figures 6A, 6B, 6C:
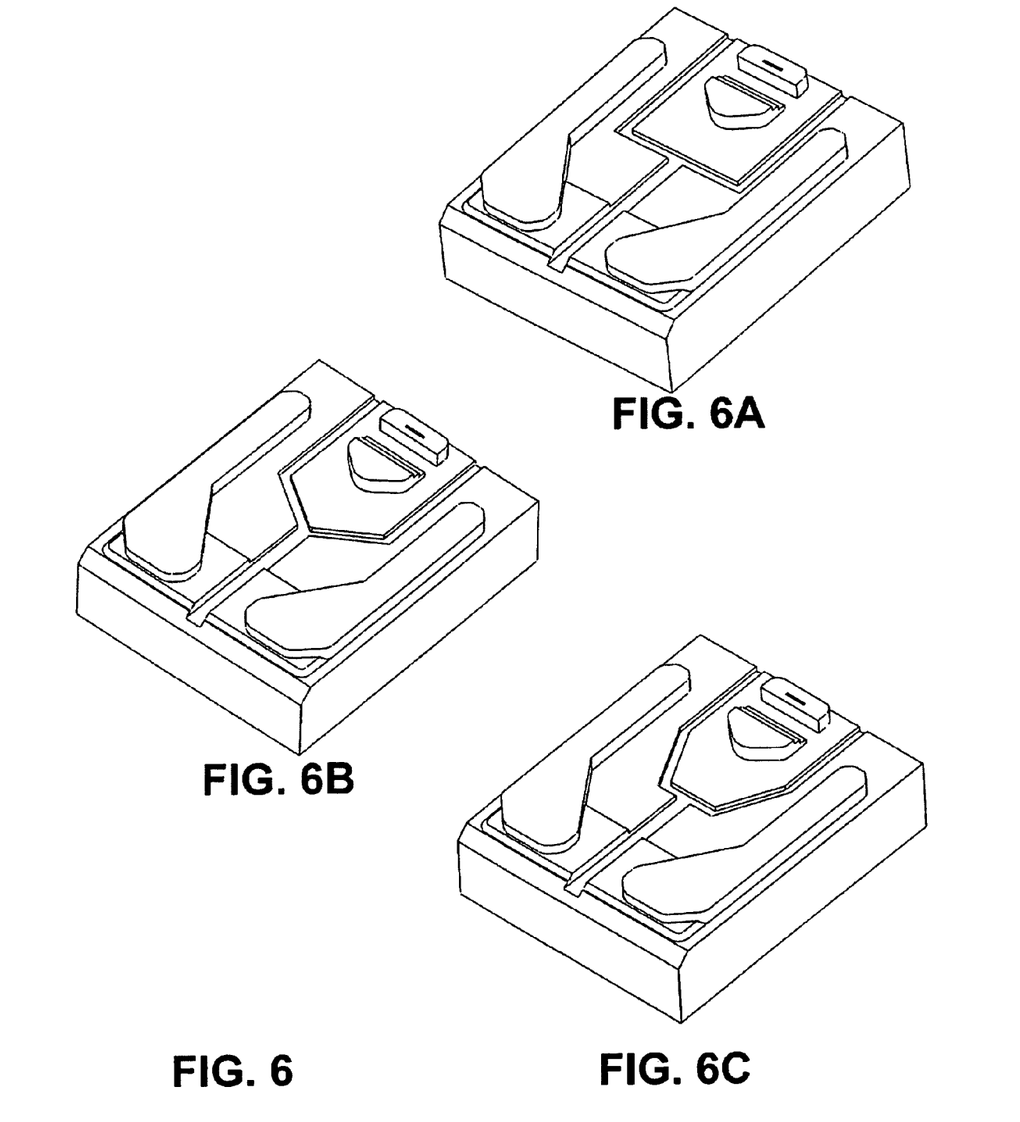
FIGS. 6a-c illustrate three sliders with combination ABS designs according to embodiments of the present invention.
Figure 7A:
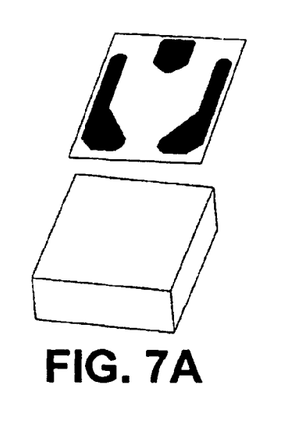
FIGS. 7a-g illustrate the process of etching the ABS design according to principles of the present invention.
Figure 7B:
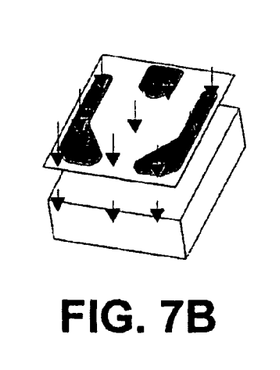
Figure 7C:
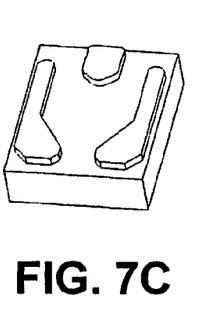
Figure 7D:
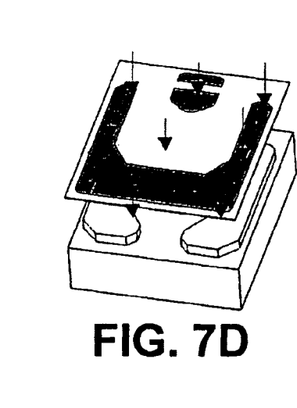
Figure 7E:
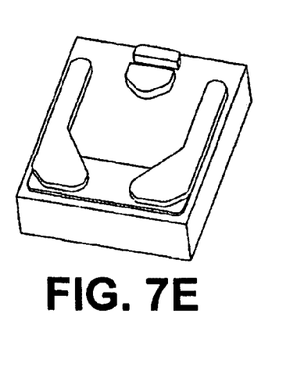
Figure 7F:
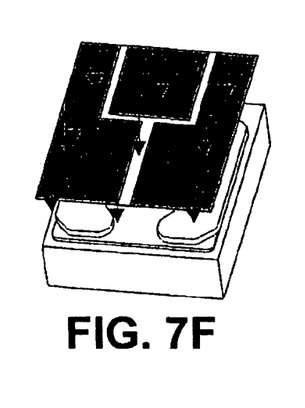
Figure 7G:
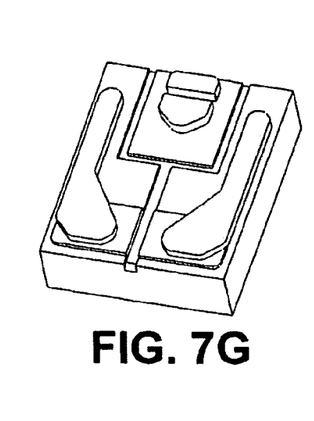

FIGS. 6a-c illustrate three sliders with combination ABS designs according to embodiments of the present invention. As shown in FIG. 7a, in one embodiment, the designs of FIG. 3a and FIG. 4b are combined. As shown in FIG. 7b, in one embodiment, the designs of FIG. 3b and FIG. 4b are combined. As shown in FIG. 7c, in one embodiment, the designs of FIG. 3c and FIG. 4b are combined.

FIGS. 7a-g illustrate the process of etching the ABS design according to principles of the present invention. In one embodiment, the ABS design is formed by known etching means, such as by masking techniques utilizing photo-resistive elements and chemical etching processes.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A slider comprising:
    a slider body;
    first and second rails on a first structure at a first depth from said first and second rails, said first and second rails extending in a longitudinal direction along the slider body;
    a first groove segment in said first structure to a groove depth, said groove depth being greater than said first depth;
    a second and third groove segment in said first structure to said groove depth, wherein
    said first groove segment extends from the leading edge of the body and between said first and second rails; and
    said second and third groove segments extend from said first groove segment to a trailing edge of the body.

2. The slider of claim 1, further comprising a third structure disposed proximately to the trailing edge of said slider body.

3. The slider of claim 2, wherein said second and third groove segments are each generally 'L'-shaped, each having one generally 90° bend.

4. The slider of claim 2, wherein said second and third groove segments each have a bend angled less than 90°.

5. The slider of claim 2, wherein said second and third groove segments generally form a 'U'-shape, each groove segment having two bends with bend angles combining to total approximately 90° for each groove segment.

6. A disk drive comprising:
    a recording medium adapted to be rotated at a given velocity;
    a flexure;
    a slider coupled to said flexure and adapted to fly above said recording medium when rotated, the slider including
    a slider body;
    first and second rails on a first structure at a first depth from said first and second rails, said first and second rails extending in a longitudinal direction along the slider body;
    a first groove segment in said first structure to a groove depth, said groove depth being greater than said first depth;
    a second and third groove segment in said first structure to said groove depth, wherein
    said first groove segment extends from the leading edge of the body and between said first and second rails; and
    said second and third groove segments extend from said first groove segment to a trailing edge of the body.

7. The disk drive of claim 6, further comprising a second structure disposed proximately to the trailing edge of said slider body, said second and third groove segments extending from said first groove segment to the trailing edge of the body on opposite sides of the third structure.

8. A slider comprising:
    a slider body;
    first and second rails on a first structure at a first depth from said first and second rails, said first and second rails extending in a longitudinal direction along the slider body;
    a third structure on said first structure disposed proximately to the trailing edge of said slider body; and
    a groove comprising a stair-stepped wall in and extending across said third structure in a direction generally perpendicular to the first and second rails.

9. The slider of claim 8, wherein said groove depth is equal to said first depth.

10. The slider of claim 8, further comprising a second structure between a portion of said first and second rails at a second depth, said first depth being greater than said second depth.

11. The slider of claim 8, wherein a wall of said groove is stair-stepped.

12. The slider of claim 11, wherein a wall of said groove is stair-stepped.

13. The slider of claim 12, wherein a wall of said groove is stair-stepped.

14. The slider of claim 8, wherein said groove is arcuate.

15. The slider of claim 8, wherein said groove is 'V'-shaped.

16. A disk drive comprising:
a recording medium adapted to be rotated at a given velocity;
a flexure;
a slider coupled to said flexure and adapted to fly above said recording medium when rotated, the slider including a slider body;
first and second rails on a first structure at a first depth from said first and second rails, said first and second rails extending in a longitudinal direction along the slider body;
a third structure on said first structure disposed proximately to the trailing edge of said slider body; and
a groove comprising a stair-stepped wall in and extending across said third structure in a direction generally perpendicular to the first and second rails.

17. The disk drive of claim 16, wherein said groove is arcuate.

18. The disk drive of claim 16, wherein said groove is 'V'-shaped.

19. A slider comprising:
first and second rails on a first structure at a first depth from said first and second rails;
a first groove segment in said first structure to a groove depth, said groove depth being greater than said first depth, said first groove segment extending from the leading edge of the body and between said first and second rails;
a second and third groove segment in said first structure to said groove depth, said second and third groove segments extending from said first groove segment to a trailing edge of the body;
a third structure on said first structure disposed proximately to the trailing edge of said slider body; and
a fourth groove to the first depth in and extending across said third structure in a direction generally perpendicular to the first and second rails.

* * * * *